(12) United States Patent
Jiang (10) Patent No.: US 12,114,598 B2
(45) Date of Patent: *Oct. 15, 2024

(54) GARDEN TOOL

(71) Applicant: Greenworks (Jiangsu) Co., Ltd., Jiangsu (CN)

(72) Inventor: Feng Jiang, Changzhou (CN)

(73) Assignee: Greenworks (Jiangsu) Co., Ltd., Jiangsu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/224,386

(22) Filed: Jul. 20, 2023

(65) Prior Publication Data

US 2023/0354742 A1    Nov. 9, 2023

Related U.S. Application Data

(63) Continuation of application No. 17/959,761, filed on Oct. 4, 2022, now Pat. No. 11,744,174, which is a (Continued)

(30) Foreign Application Priority Data

Dec. 14, 2018   (CN) .......................... 201811533580.5

(51) Int. Cl.
  *A01D 34/68*    (2006.01)
  *A01D 34/82*    (2006.01)
  *A01D 101/00*   (2006.01)

(52) U.S. Cl.
  CPC ....... *A01D 34/6806* (2013.01); *A01D 34/828* (2013.01); *A01D 2101/00* (2013.01)

(58) Field of Classification Search
  CPC .............. A01D 34/6806; A01D 34/828; A01D 34/6818; A01D 34/76; A01D 34/824; A01D 2101/00
  See application file for complete search history.

(56) References Cited

U.S. PATENT DOCUMENTS 5,203,147 A    4/1993  Mizutani et al.
5,806,374 A    9/1998  Mizutani et al.
(Continued)

FOREIGN PATENT DOCUMENTS

EP    0047416 A    3/1981
EP    3103317 A    12/2016
(Continued)

OTHER PUBLICATIONS

European Search Report and Search Opinion in related European Patent Application No. 19216560.3 dated Apr. 29, 2020; 5 pages.

*Primary Examiner* — Abigail A Risic
(74) *Attorney, Agent, or Firm* — Rooney IP, LLC (57) ABSTRACT

A garden tool, including a main body, a walking wheel mounted on the main body, a self-propelled motor for driving the walking wheel, and a control panel disposed on the main body. The control panel includes a self-propelled control assembly. The self-propelled control assembly includes a self-propelled start paddle and a speed regulating button. Pressing the self-propelled start paddle activates self-propelled operation of the garden tool. The self-propelled start paddle can be released for a short time and the speed regulating button can be adjusted within the short time. The self-propelled start paddle can be re-pressed within the short time and after the speed regulating button is adjusted, and the garden tool maintains the self-propelled operation.

13 Claims, 7 Drawing Sheets

Related U.S. Application Data continuation of application No. 16/715,238, filed on Dec. 16, 2019, now Pat. No. 11,503,760.

(56) References Cited

U.S. PATENT DOCUMENTS

| | | | |
|---|---|---|---|
| 10,433,478 B2 * | 10/2019 | Smith | ............ A01D 34/52 |
| 2007/0039301 A1 | 2/2007 | Velke et al. | |
| 2010/0162674 A1 | 7/2010 | Eaton et al. | |
| 2018/0077862 A1 | 3/2018 | Smith | |
| 2018/0146619 A1 | 5/2018 | Oota et al. | |
| 2019/0307066 A1 | 10/2019 | Jiang | |
| 2020/0245555 A1 | 8/2020 | Colber et al. | |
| 2020/0375102 A1 | 12/2020 | Arendt et al. | |
| 2021/0037701 A1 | 2/2021 | Kaskawitz et al. | |
| 2021/0337727 A1 | 11/2021 | Dong et al. | |

FOREIGN PATENT DOCUMENTS

| | | |
|---|---|---|
| WO | WO2018101086 A | 6/2018 |
| WO | WO2017215604 A | 4/2019 |

* cited by examiner

GARDEN TOOL

CROSS REFERENCE TO RELATED APPLICATIONS

This application is a continuation of U.S. application Ser. No. 17/959,761 filed on Oct. 4, 2022, which is a continuation application of U.S. application Ser. No. 16/715,238 filed on Dec. 16, 2019 (now U.S. Pat. No. 11,503,760), which claims priority to CN Patent Application Serial No. CN201811533580.5 filed on Dec. 14, 2018, the disclosures of which are hereby incorporated by reference in their entirety.

TECHNICAL FIELD

The present invention relates to a garden tool, in particular to a garden tool having a simple control structure which is safe and convenient.

BACKGROUND ART

With the continuous improvement of living standards and the need to beautify the environment, the area of lawn use has increased rapidly. Whether it is municipal, residential, football fields, golf courses, etc., the lawn maintenance work has doubled. Garden tools such as lawn mowers play an important role in lawn maintenance work as a green maintenance facility. The existing garden tools in the market, especially the push-back garden tools, are provided with an obliquely extending push rod structure behind the main body of the garden tool. In order to reduce the operator's fatigue, a self-propelled drive mechanism is generally equipped, and the self-propelled drive mechanism transmits the power of the mower engine from the transmission belt to the self-propeller assembly through the combination or separation of the clutch device in the self-propeller assembly to achieve the self-propelling or stopping of the mower. After the self-propelled drive is added, the control structure of the garden tool becomes more complicated and ease to cause confusion. Moreover, the operator needs to grasp the push rod with both hands. When the operator lose the rod unintentionally due to negligence, it needs to be restarted, which is inconvenient to control garden tools.

Therefore, existing garden tools need to be improved to overcome the above-mentioned deficiencies.

SUMMARY OF INVENTION

The purpose of the invention is to provide a garden tool with a simple control structure which is safe and convenient.

In order to achieve the above-mentioned object, the invention provides a garden tool which comprises a main body, a walking wheel mounted on the main body and a control panel disposed on the main body, wherein the control panel comprises a main blade control assembly. The main blade control assembly comprises a main blade button and a main blade pull rod. When starting the garden tool, the two actions of starting the main blade button and starting the main blade pull rod can be performed at intervals, but it needs to be completed within a certain time.

Further, said main blade control assembly comprises a first main blade control switch connected to the main blade button, a second main blade control switch connected to the main blade pull rod, a button return spring, a rod clamp and a clamp return spring; the starting of the garden tool requires the main blade button and the main blade pull rod to respectively control the first main blade control switch and the second main blade control switch to send signals; the main blade button is a point-touch type. And when there is no external force, the button return spring and the clamp return spring make the main blade button in the up state, and the main blade pull rod returns.

Further, the main blade pull rod needs to be kept in the on state during the working process, and the garden tool stops working regardless of the state of the main blade button after the main blade pull rod is released.

Further, said control panel is further provided with a self-propelled control assembly, and said self-propelled control assembly comprises a self-propelled start paddle and a speed regulating button. After the self-propelled start paddle is turned on, the self-propelled start paddle can be released during the self-propelled process. The speed regulating button is adjusted in a short time, and the self-propelled start paddle is re-pressed after the adjusted, and the garden tool can keep self-propelled.

Further, said self-propelled control assembly comprises a self-propelled switch connected to the self-propelled start paddle, a potentiometer connected to the speed regulating button, and a paddle return spring. The self-propelled switch sends a signal to start the self-propelled motor, and the elastic force of the paddle return spring causes the self-propelled start paddle to return to the initial position, and the self-propelled motor stops running; the speed regulating button is provided with teeth, and the teeth of the speed regulating button are connected to the speed regulating pinion connected to the potentiometer.

Further, the self-propelled control assembly further comprising a damping spring. Said damping spring is fixed at one end, and the other end is extended between the teeth of the speed regulating button. The other end of the damping spring causes the speed regulating button to be touched when adjusting the speed regulating button.

Further, said control panel is mounted on the main body by a push rod, which comprises an upper panel and a lower panel. Said upper panel and said lower panel together form a mounting portion for mounting the control panel on said push rod and a receiving portion for mounting the main blade control assembly and the self-propelled control assembly.

Further, said receiving portion is provided with a first cavity and a second cavity above said first cavity, wherein said first cavity is formed by said upper panel and said lower panel. Said main blade control assembly is located in said first cavity; an upper cover is disposed above the upper panel, said second cavity is formed by the upper cover and the upper panel, and the self-propelled control assembly is located in the second cavity. The main blade button, the main blade pull rod, the self-propelled start paddle and the speed regulating button are all located on the side of the control panel facing the operator of the garden tool.

Further, said self-propelled start paddle and said main blade pull rod are pivotally connected to the control panel, and the starting of both of them are rotating in a direction closer to each other. The self-propelled start paddle, the main blade pull rod and the push rod are arranged close to each other, so that the operator can grasp the three at the same time.

Further, said main body comprises a main blade, a motor for driving the main blade, a self-propelled motor for driving the walking wheel, and a power supply for supplying power to the motor. And said control panel controls the work of the self-propelled motor and the motor.

The beneficial effects of the present invention are: when starting the garden tool, the two actions of starting the main blade button and starting the main blade lever can be performed at intervals, but it needs to be completed within a certain time, thereby ensuring the simplicity of operation and the safety of operation.

DESCRIPTION OF EMBODIMENTS

In order to make the objects, technical solutions and advantages of the present invention more clearly, the present invention will be described in detail below with reference to the drawings and specific embodiments.

It is also to be noted that, in order to avoid obscuring the invention in unnecessary detail, only the structures and/or processing steps closely related to the aspects of the present invention are shown in the drawings, and other details not relevant to the present invention is omitted.

In addition, it should be noted that the terms "comprise", "comprising" or any other variation thereof are to cover non-exclusive inclusions, such that a process, method, article, or device that comprises a plurality of elements comprise not only those elements but also other items not specifically listed, or elements that are inherent to such a process, method, item, or device.

Figure 1:
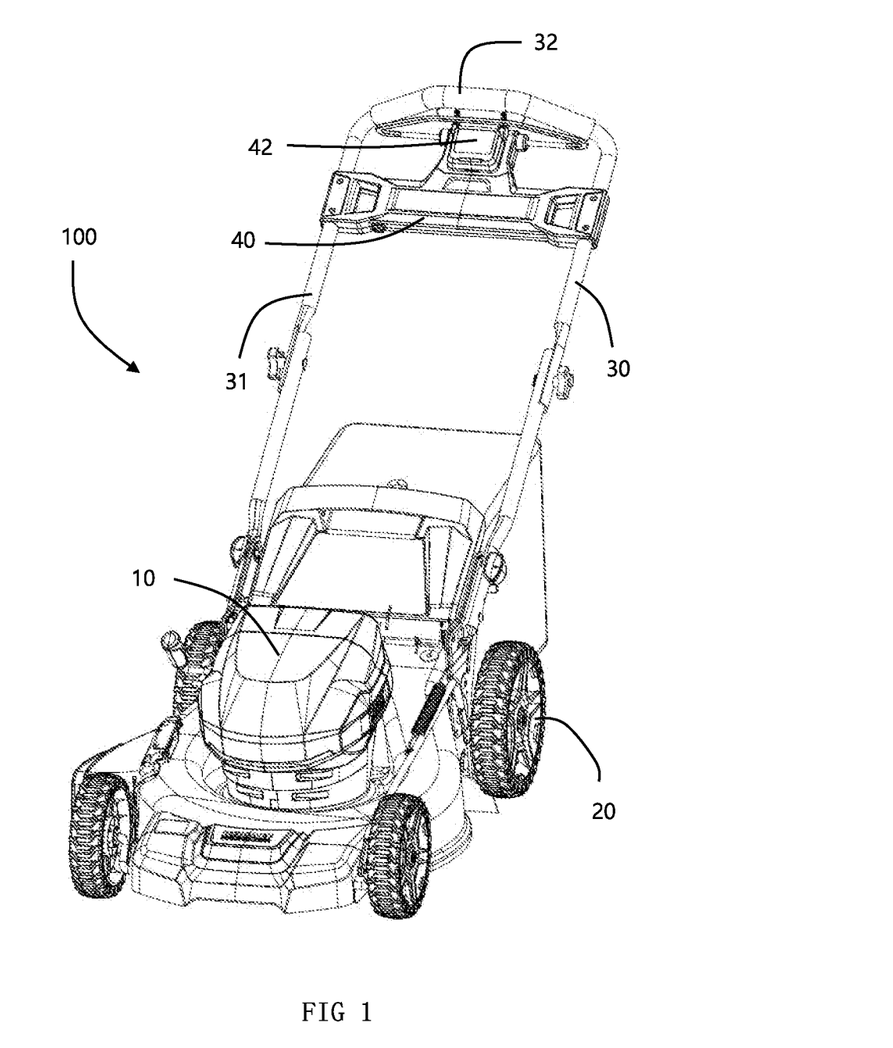
FIG. 1 is a perspective view of the lawn mower of the present embodiments.
Figure 2:
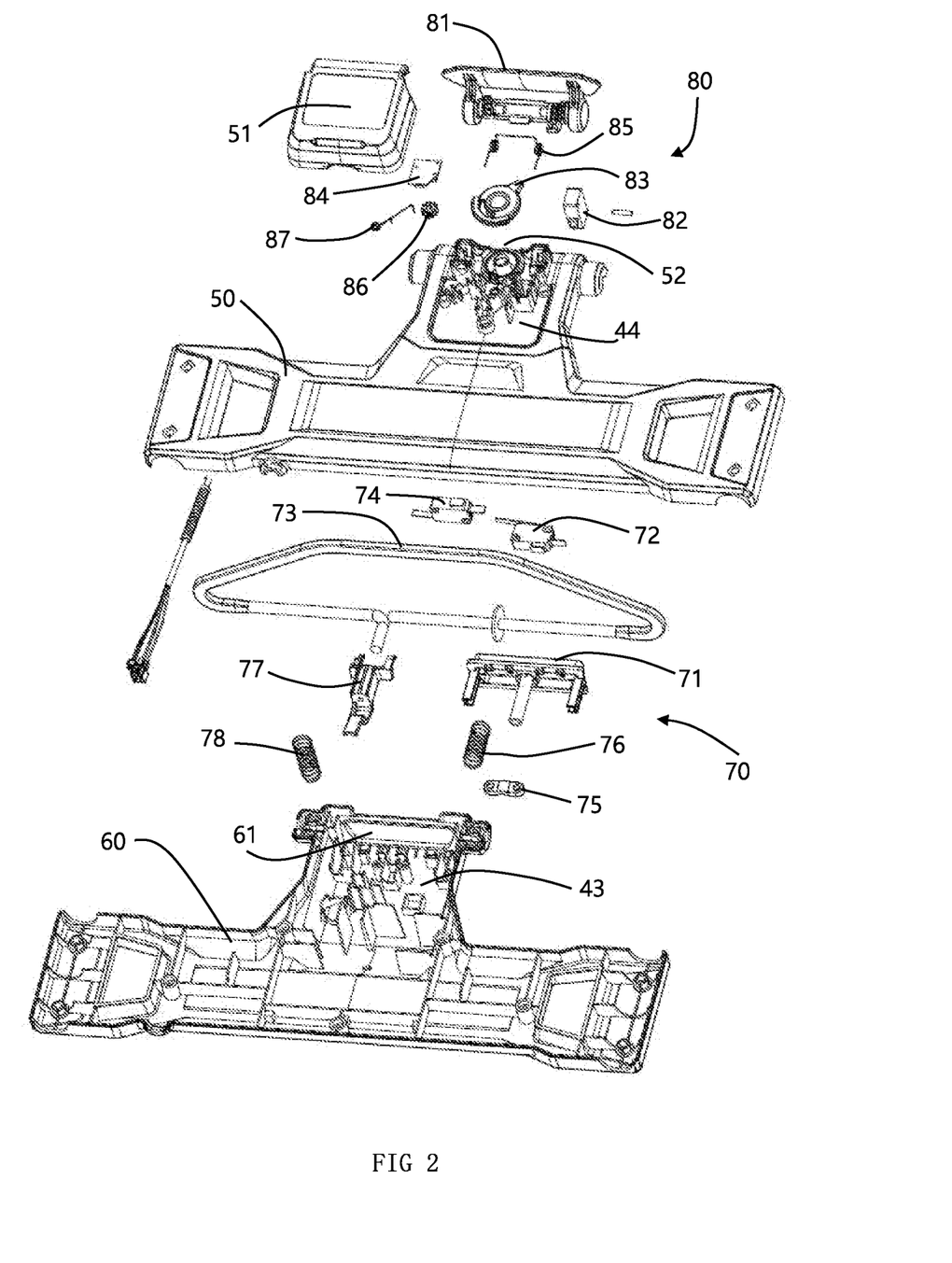
FIG. 2 is an exploded perspective view of the control panel in FIG. 1.
Figure 3:
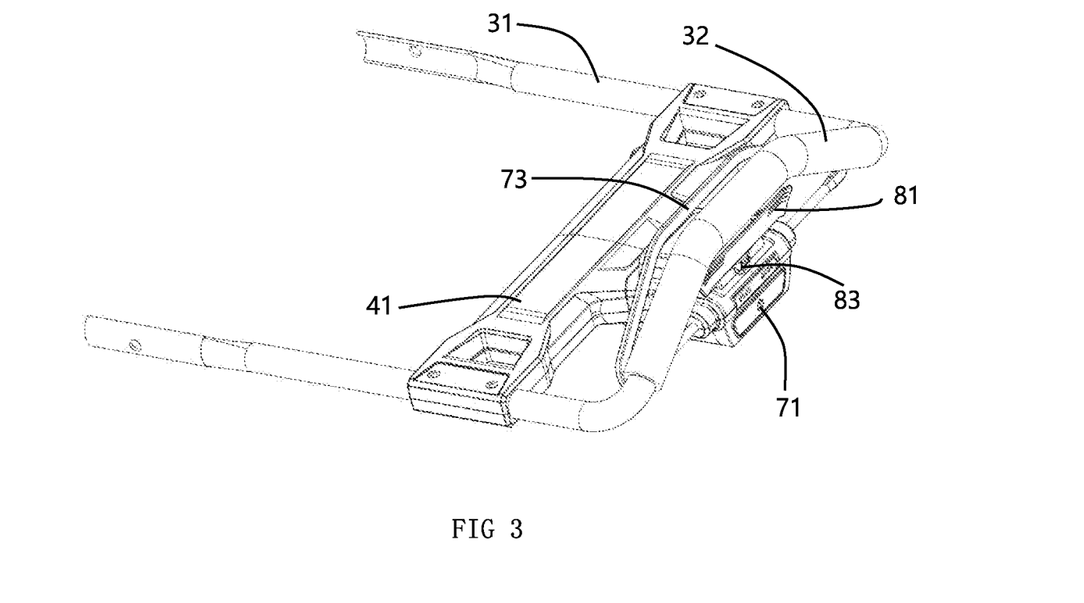
FIG. 3 is a perspective assembled view of the control panel and the push rod in FIG. 1.

The present invention relates to a garden tool, which is a lawn mower in one embodiment, as shown in FIG. 1 and FIG. 3. The lawn mower 100 comprises a main body 10, a walking wheel 20 mounted on the main body 10, a push rod 30 that is disposed behind the main body 10 and extends obliquely upward, and a control panel 40 that controls the operation of the lawn mower 100. The main body 10 comprises a main blade for cutting the lawn, a motor for driving the main blade, a self-propelled motor for driving the walking wheel, and a power supply for supplying power to the motor. The push rod 30 is U-shaped, comprising a pair of side rods 31 and an upper push rod 32 connecting to the pair of side rods 31. The upper push rod 32 has a three-stage structure. It is easy to operate and grasp for the operator as an operating portion. The control panel 40 has an inverted T-shaped structure and is fixed to the push rod 30. The control panel 40 comprises a laterally extending mounting portion 41 mounted on a pair of side bars 31 and a receiving portion 42 extending rearward from the central portion of the mounting portion 41. The control panel 40 is disposed near the top of the push rod 30, and the receiving portion 42 of the control panel 40 is disposed adjacent to the upper push rod 32.

As shown in FIG. 2 to FIG. 5, the control panel 40 comprises an upper panel 50, a lower panel 60, a main blade control assembly 70, and a self-propelled control assembly 80. The receiving portion 42 comprises a first cavity 43 and a second cavity 44. The first cavity 43 is formed by the upper panel 50 and the lower panel 60, and the main blade control assembly 70 of the lawn mower 100 is mounted within the first cavity 43. The main blade control assembly 70 comprises a main blade button 71 and a first main blade control switch 72 connected to the main blade button 71, a main blade pull rod 73, and a second main blade control switch 74 connected to the main blade pull rod 73. The first main blade control switch 72 is controlled by a main blade button 71 which reciprocate in the axial direction of the control panel 40, and the main blade button 71 is fixed to the lower panel 60 with a pressure plate 75. A button return spring 76 is located between the main blade button 71 and the first main blade control switch 72, and the main blade button 71 is in a pop-up state without external force. The main blade button 71 is a point-touch type. When the main blade button 71 is pressed at the start, the first main blade control switch 72 is activated to send a signal, and then the main blade button 71 can be released, which is rebounded by a button return spring 76.

Figure 4:
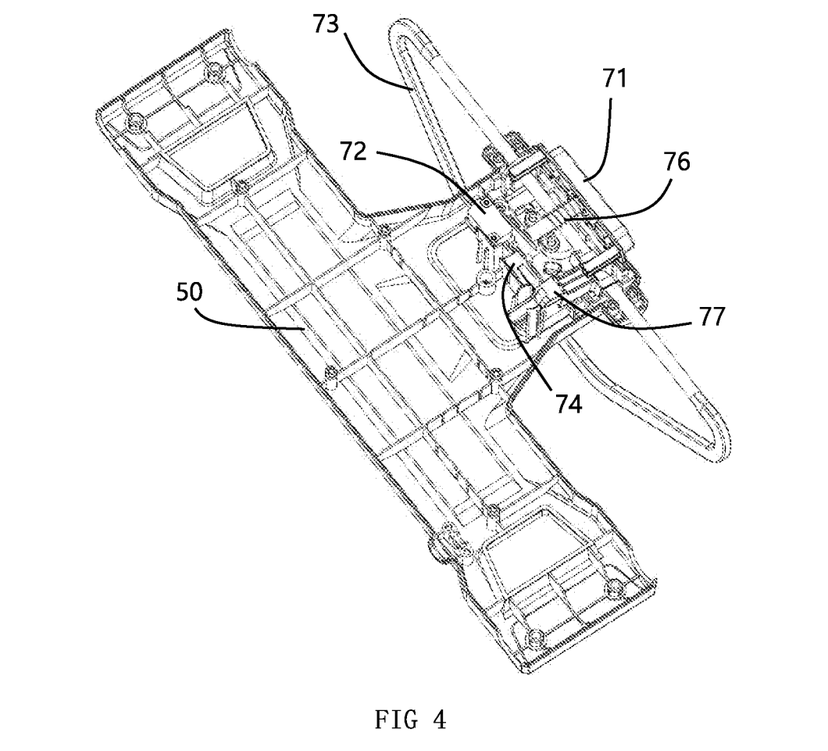
FIG. 4 is an assembly schematic view of the main blade control assembly after removing the lower panel.
Figure 5:
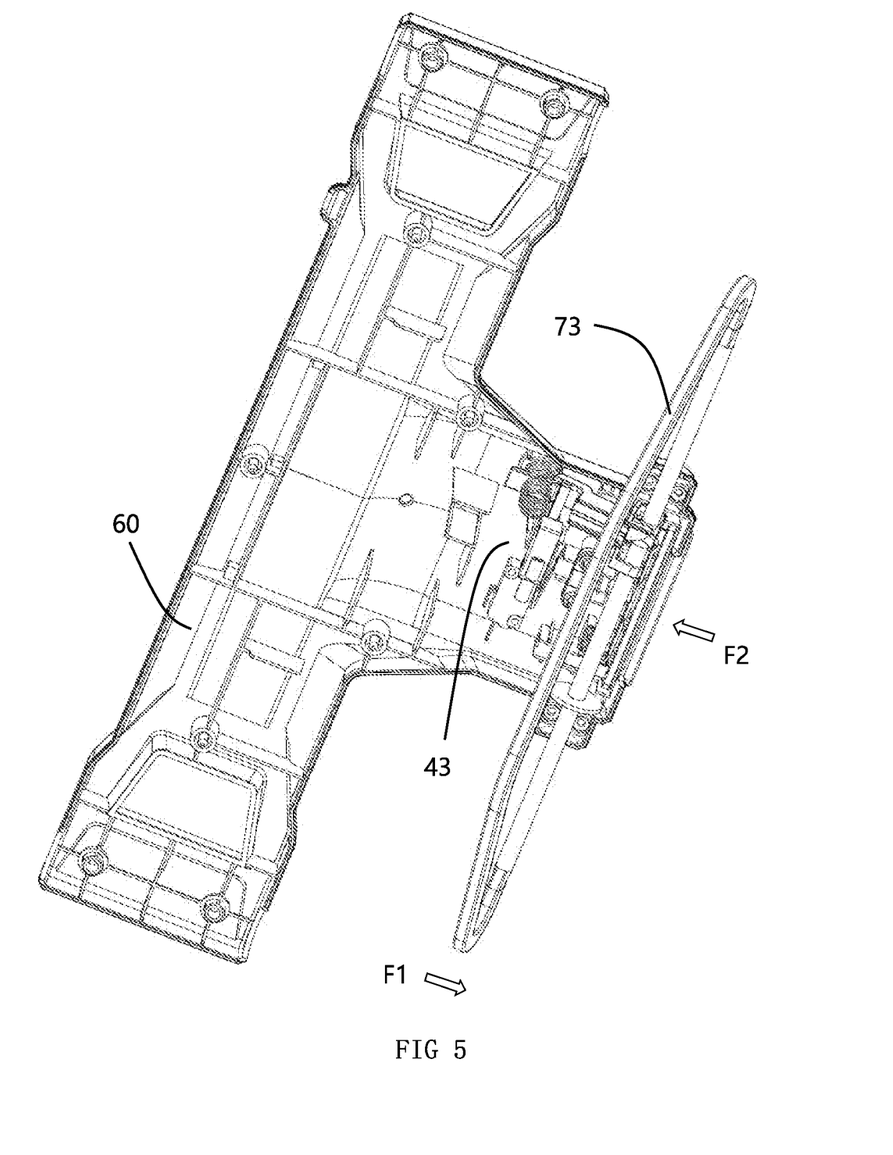
FIG. 5 is an assembly schematic view of the main blade control assembly after removing the upper panel.

For the operator's operational comfort, the shape of the main blade pull rod 73 matches the upper push rod 32 of the push rod 30, and is also a three-stage structure. A pull rod clamp 77 is located between the main blade pull rod 73 and the second main blade control switch 74. The main blade pull rod 73 is provided with a clamp return spring 78. When the main blade pull rod 73 is released, the clamp return spring 78 is exerts a force on the pull rod clamp 77, abutting against the pull rod clamp 77 to be separated from the second main blade control switch 74, and the main blade pull rod 14 is separated from the upper push rod 32 of the push rod 30 to return.

When the lawn mower is started, it needs to touch the main blade button 71 and pull the main blade pull rod 73 to control the first main blade control switch 72 and the second main blade control switch 73 to send signals. In the present invention, both the start of the main blade button 71 and the activation of the main blade pull rod 73 can be started within a certain period of time (preferably 5 s). Specifically, after the main blade button 71 is pressed, the first main blade control switch 72 sends a signal to the control panel, and when the main blade pull rod 73 is attached to the upper push rod 32 of the push rod within a certain time, the main blade motor of the lawn mower 100 is started, and driving the main blade to rotate. After the specified time is exhausted, even the main blade pull rod 73 is pulled, the main blade motor cannot be started. And the main blade button 71 needs to be touched again, and the main blade pull rod 73 is pulled again, then the main blade motor can be started.

In the present invention, the two actions of touching the main blade button 71 and pulling the main blade pull rod 73 are in no particular order, and the first main blade control switch 72 and the second main blade control switch 73 both need to be triggered to start the main blade. After started, the main blade button 71 does not need to be pressed all the time as it is touch type, the main blade pull rod 74 needs to be kept pulled, and after the main blade pull rod 73 is released, the lawn mower 100 stops working regardless of the state of the main blade button 71. This setting ensures the simplicity and the safety of operation.

Referring to FIG. 2 and FIG. 6 to FIG. 9, an upper cover 51 is disposed above the upper panel 50, and a second cavity 44 is formed between the upper cover 51 and the upper panel 50. The second cavity 44 is located above the first cavity 43 for mounting and receiving the self-propelled control assembly 80. The self-propelled control assembly 80 comprises a self-propelled start paddle 81, a self-propelled switch 82 connected to the self-propelled start paddle 81, a speed regulating button 83, and a potentiometer 84 connected to the speed regulating button 83. The self-propelled start paddle 81 is pivotally coupled to the control panel 40, and a paddle return spring 85 is disposed between the self-propelled start paddle 81 and the control panel 40. When the self-propelled start paddle 81 is pushed forward, the self-propelled start paddle 81 touches the self-propelled switch 82, and the self-propelled switch 82 sends a signal to the control panel to activate the self-propelled motor. When the self-propelled start paddle 81 is no longer pressed, the elastic force of the paddle return spring 85 causes the self-propelled start paddle 81 to return to the initial position, and the self-propelled motor stops working.

Figure 6:
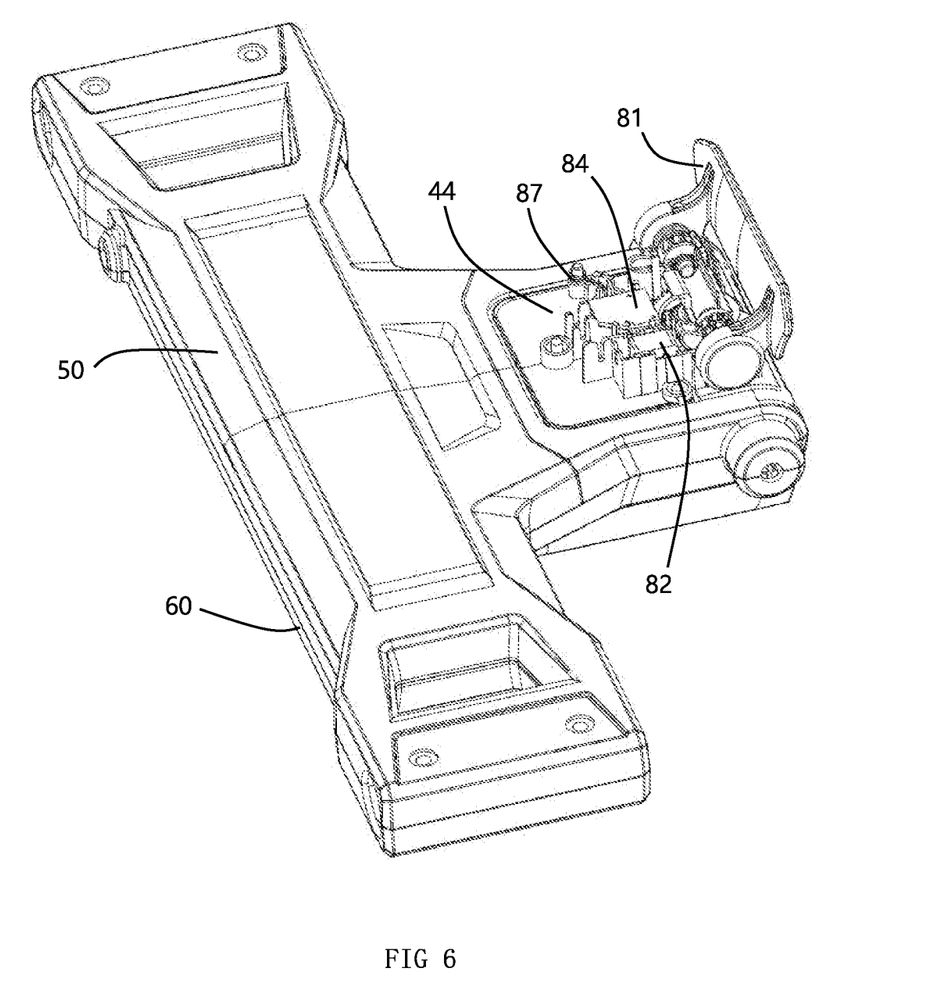
FIG. 6 is an assembly schematic view of the self-propelled control assembly after removing the upper cover.
Figure 7:
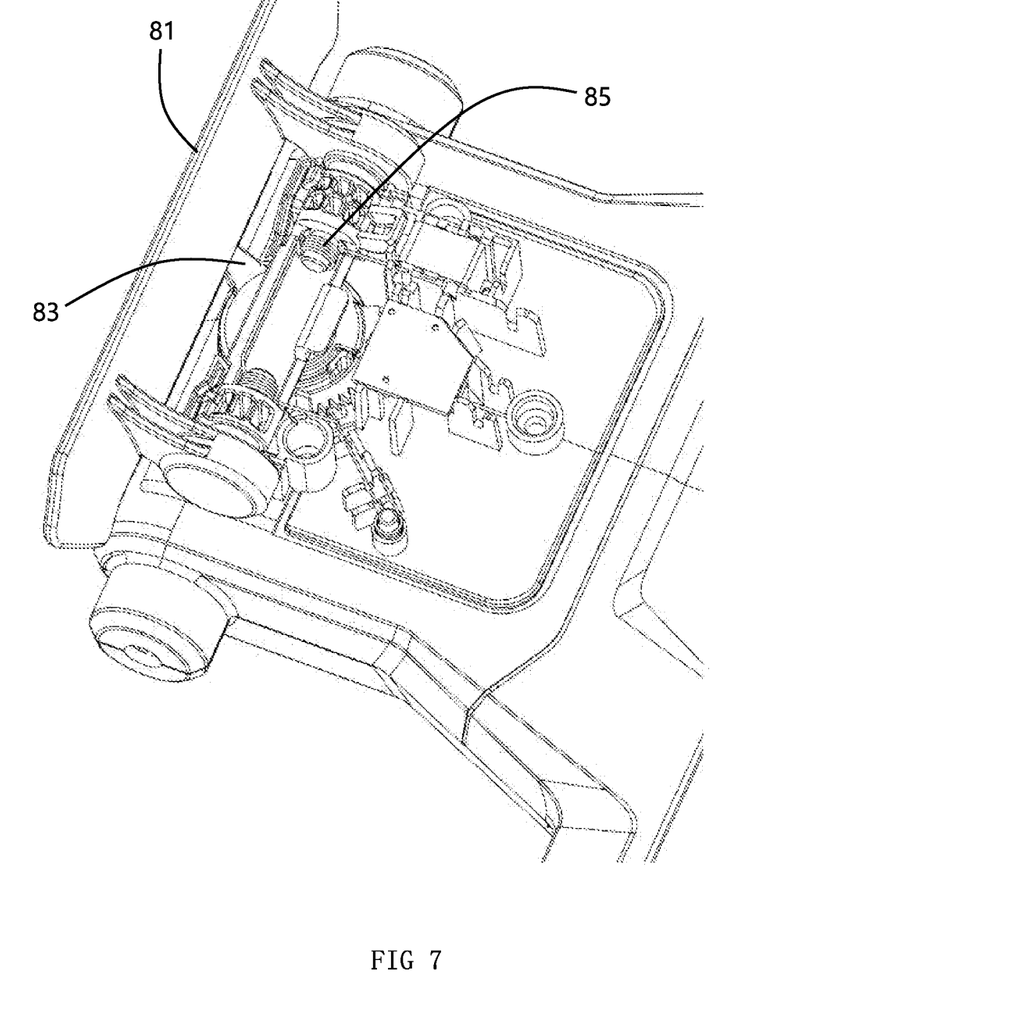
FIG. 7 is an assembly schematic view of the self-propelled control assembly from another angle.

The speed regulating button 83 has teeth thereon, and the speed regulating button 8 is connected with a speed regulating pinion 86 connected to the potentiometer 84. By adjusting the speed regulating button 83, the signal output from the potentiometer 84 to the control panel can be adjusted. Thereby, the self-propelled speed of the lawn mower 100 is adjusted. In the present embodiment, the self-propelled speed can be adjusted, and the self-propelled speed can be adjusted before the self-propelled start paddle 81 is pressed or after the self-propelled start paddle 81 is pressed. During the self-propelling process, the self-propelled start paddle 81 can be released, and in a short time (preferably 1.5 s), the speed regulating button 83 is adjusted, the self-propelled motor is still running normally, and after adjusting the speed regulating button 83, the self-propelled start paddle 81 is pressed again, and the self-propelled motor continues to run. During this process, the garden tool can keep self-propelled. If the self-propelled start paddle 81 is released for more than 1.5 seconds, since the control panel neither detects the signal of the potentiometer 84 nor detects the signal of the self-propelled switch 82, the self-propelled motor immediately stops working.

Preferably, a damping spring 87 is further mounted in the second cavity 44 between the upper cover 51 and the upper panel 50. The one end of damping spring 87 is fixed at the upper panel 50 and the other end is extended between the teeth of the speed regulating button 83. When the speed regulating button 83 is adjusted, the end of the damping spring 87 causes the speed regulating button 83 to be activated, so that there is a sense of manipulation when adjusting. If there is no damping spring 87, the mounting clearance of the speed regulating button 83 ensures the tightness of the movement of the speed regulating button 83 with the mounting clearance of the upper cover 51, the upper panel 50 and the self-propelled paddle 81. If it is too loose, the speed regulating button 83 will rotate by itself when the whole machine is vibrating; if it is too tight, it will not move or feel bad; and the invention includes the damping spring 87, which can not only prevent non-operating rotation of the speed regulating button 83, but also ensures the safety of the operation.

In the present invention, the main blade control assembly 70 and the self-propelled control assembly 80 are mounted in the receiving portion 42 of the control panel 40. The main blade button 71, the main blade pull rod 73, the self-propelled start paddle 81 and the speed regulating button 83 are all disposed on the side of the control panel 40 facing the operator of the garden tool, and the entry surface forms a manipulation zone. The control panel 40 is provided with two openings on the side facing the garden tool operator, specifically a first opening 61 disposed on the lower panel 60 and a second opening 52 disposed on the upper panel 50. The main blade button 71 and the speed regulating button 83 are disposed in the first opening 61 and the second opening 52, respectively. The self-propelled start paddle 81 and the main blade pull rod 73 are pivotally coupled to the control panel 40. The main blade button 71 is located at the lower portion of the manipulation area, the speed regulating button 83 is located at the middle of the manipulation area, and the self-propelled start paddle 81 and the main blade pull rod 73 are located at the upper portion of the manipulation area. Further, the self-propelled start paddle 81, the main blade pull rod 73 and the upper push rod 32 are disposed adjacent to each other, so that the operator can grasp the three at the same time and simultaneously control the self-propelled start paddle 81 and the main blade pull rod 73. At the time of starting, the self-propelled start paddle 81 and the main blade pull rod 73 rotate in a direction close to each other. Referring to FIG. 5 together, the main blade pull rod 73 rotates backward in the F1 direction, and the self-propelled start paddle 81 is oriented in the F2 direction, rotates to move forward, the operator can start both at the same time when gripping, without making a big move.

Figure 8:
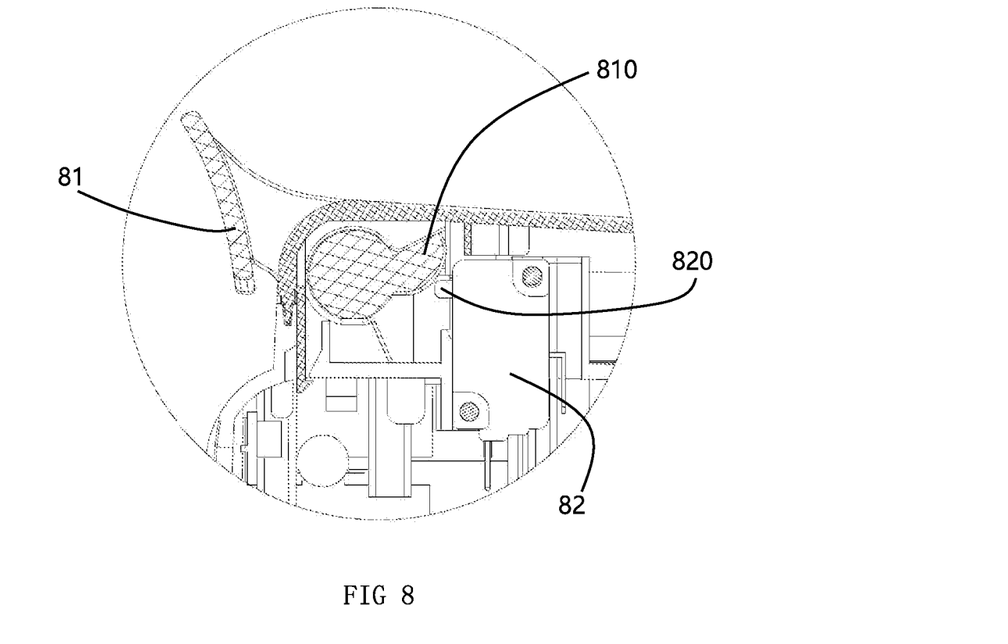
FIG. 8 is a partial cross-sectional view of the self-propelled start paddle in the initial position before pressed.
Figure 9:
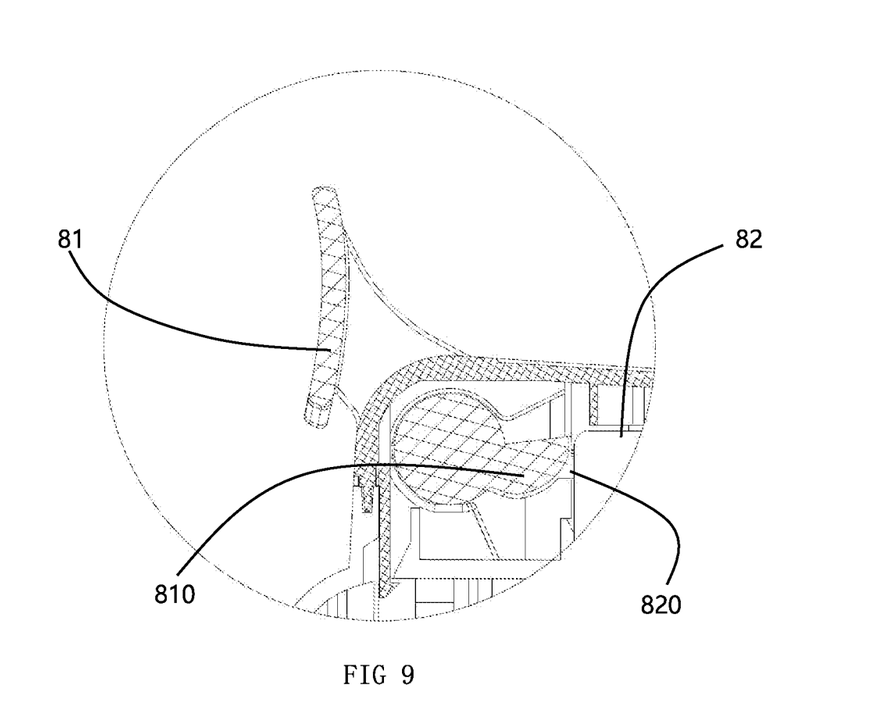
FIG. 9 is a partial cross-sectional view of the self-propelled start paddle touching the self-propelled switch after pressed.

When the lawn mower is started, the main blade button 71 can be pressed firstly, and the main blade pull rod 73 can be pulled to fit the push rod 30 for a certain period of time. Alternatively, the main blade pull rod 73 can be pulled to fit the push rod 30, and then the main blade button 71 is pressed. After the first main blade control switch 72 and the second main blade control switch 74 are successively triggered in a certain period of time, the main blade motor of the lawn mower 100 is started to drive the main blade to rotate. When the self-propelled mechanism is started, the self-propelled start paddle 81 is pushed forward in the power-on state of the whole machine, and the starting boss 810 of the self-propelled start paddle 81 is started to the contact 820 of the self-propelled switch 82, and the self-propelled switch 82 is closed and powered on. At this time, the self-propelled motor starts working. If it is necessary to adjust the walking speed of the machine, push the speed regulating button 83 to the left or right. The gears of the speed regulating button 83 and the speed regulating pinion 86 connected to the potentiometer 84 are combined by the tooth shape to adjust the resistance value to change the rotation speed of the self-propelled motor, so as to change the speed of self-propelled walking. When the self-propelled start paddle 81 is released, the self-propelled start paddle 81 is returned to the home position by the paddle return spring 85, the self-propelled switch is disconnected, and the self-propelled system stops working.

The invention integrates the self-propelled control assembly and the control assembly of the functional component of the garden tool, mounts them on the receiving portion of the control panel, and sets the manipulation area on the side of the control panel facing the operator. And the main blade button 71, the main blade pull rod 73, the self-propelled start paddle 81 and the speed regulating button 83 are disposed close to each other, in particular, the main self-propelled start paddle 81, the main blade pull rod 73 and the upper push rod 32 that need to be kept to be also disposed adjacent to each other during operation, the operator does not need to make large movements during operation, and the control panel can be controlled conveniently and quickly.

When starting the garden tool, the two actions of starting the main blade button 71 and starting the main blade pull rod 73 can be performed at intervals, but it needs to be completed within a certain time; after starting the self-propelled start paddle, the self-propelled start paddle 81 can be released, and the speed regulating button 83 is adjusted in a short time, the self-propelled motor is still operating normally; thereby ensuring the simplicity of operation and the safety of operation.

The above embodiments are only used to illustrate the technical solutions of the present invention, not for limitation. Although the present invention is described in detail with reference to the preferred embodiments, ordinary technicians in the field should understand that the technical solutions of the present invention may be modified or substituted without departing from the spirit and scope of the technical solutions of the present invention.

What is claimed is:

1. A garden tool, comprising:
   a main body;
   a walking wheel mounted on the main body;
   a self-propelled motor for driving the walking wheel;
   a push rod disposed behind the main body and extending obliquely upward, the push rod including a pair of side rods and an upper push rod connecting to the pair of side rods; and
   a control panel fixed to the push rod, the control panel having an inverted T-shaped structure including a laterally extending mounting portion mounted on the pair of side rods, and a receiving portion extending rearward from a central portion of the mounting portion;
   wherein the control panel comprises a main blade control assembly and a self-propelled control assembly, the main blade control assembly and the self-propelled control assembly are mounted on the receiving portion.

2. The garden tool according to claim 1, wherein the control panel is disposed near a top of the push rod, and
   the receiving portion of the control panel is disposed adjacent to the upper push rod.

3. A garden tool, comprising:
   a main body;
   a walking wheel mounted on the main body;
   a self-propelled motor for driving the walking wheel;
   a push rod disposed behind the main body and extending obliquely upward, the push rod including a pair of side rods and an upper push rod connecting to the pair of side rods; and
   a control panel fixed to the push rod, the control panel having an inverted T-shaped structure including a laterally extending mounting portion mounted on the pair of side rods, and a receiving portion extending rearward from a central portion of the mounting portion;
   wherein the control panel comprises:
      a main blade control assembly; and
      a self-propelled control assembly, and
   wherein the main blade control assembly comprises:
      a main blade button;
      a first main blade control switch connected to the main blade button;
      a main blade pull rod; and
      a second main blade control switch connected to the main blade pull rod.

4. The garden tool according to claim 3, wherein the first main blade control switch is controlled by the main blade button which reciprocates essentially in an axial direction along the control panel.

5. The garden tool according to claim 4, wherein the main blade button is point-touch, the main blade button is pressed when starting, the first main blade control switch is activated to send a signal, and then the main blade button is released, which is rebounded by a button return spring.

6. The garden tool according to claim 5, wherein when the main blade button is touched, and the main blade pull rod is pulled to control the first main blade control switch and the second main blade control switch to send signals, a blade of the lawn mower is triggered.

7. The garden tool according to claim 3, wherein the self-propelled control assembly comprises:
   a self-propelled start paddle; and
   a speed regulating button.

8. The garden tool according to claim 7, wherein the self-propelled start paddle is pivotally coupled to the control panel, and a paddle return spring is disposed between the self-propelled start paddle and the control panel.

9. The garden tool according to claim 7, wherein the self-propelled control assembly further comprises:
   a self-propelled switch connected to the self-propelled start paddle; and
   a potentiometer connected to the speed regulating button.

10. The garden tool according to claim 9, wherein when the self-propelled start paddle is pushed forward, the self-propelled start paddle touches the self-propelled switch, and the self-propelled switch sends a signal to the control panel to activate the self-propelled motor.

11. The garden tool according to claim 7, wherein after the self-propelled start paddle is activated, the self-propelled start paddle can be released for a short time, the speed regulating button can be adjusted within the short time, the self-propelled start paddle can be re-activated within the short time and after the speed regulating button is adjusted, and the garden tool maintains the self-propelled operation.

12. The garden tool according to claim 3, wherein the self-propelled start paddle and the main blade pull rod are pivotally coupled to the control panel,
   the main blade button is located at the lower portion of manipulation area,
   the speed regulating button is located at the middle of the manipulation area, and
   the self-propelled start paddle and the main blade pull rod are located at the upper portion of the manipulation area.

13. A lawn mower, comprising:
   a main body;
   at least one walking wheel mounted on the main body;
   a self-propelled motor for driving the walking wheel;
   a main blade;
   a motor for driving the main blade;
   a push rod disposed behind the main body and extending obliquely upward, the push rod including a pair of side rods and an upper push rod connecting to the pair of side rods; and
   a control panel fixed to the push rod, the control panel having an inverted T-shaped structure including a laterally extending mounting portion mounted on the pair of side rods, and a receiving portion extending rearward from a central portion of the mounting portion;
   wherein the control panel comprises:
      a main blade control assembly; and
      a self-propelled control assembly, and
   the main blade control assembly comprises:
      a main blade button;
      a first main blade control switch connected to the main blade button;

a main blade pull rod; and
a second main blade control switch connected to the main blade pull rod.

\* \* \* \* \*